United States Patent
Jiang et al.

(10) Patent No.: US 10,083,709 B2
(45) Date of Patent: Sep. 25, 2018

(54) TRANSFORMER NOISE SUPPRESSION METHOD

(71) Applicants: STATE GRID JIANGSU ELECTRIC POWER COMPANY NANJING POWER SUPPLY COMPANY, Nanjing (CN); STATE GRID JIANGSU ELECTRIC POWER COMPANY, Nanjing (CN); STATE GRID COMPANY CORPORATION OF CHINA, Beijing (CN); Hohai University, Nanjing (CN)

(72) Inventors: Ning Jiang, Nanjing (CN); Hongzhong Ma, Nanjing (CN); Kai Li, Nanjing (CN); Honghua Xu, Nanjing (CN); Chunning Wang, Nanjing (CN); Bingbing Chen, Naning (CN); Hongyu Jiang, Nanjing (CN)

(73) Assignees: STATE GRID JIANGSU ELECTRIC POWER COMPANY NAN JING POWER SUPPLY COMPANY, Nanjing, or Beijing (CN); STATE GRID JIANGSU ELECTRIC POWER COMPANY, Nanjing, or Beijing (CN); STATE GRID COMPANY CORPORATION OF CHINA, HOHAI UNIVERSITY, Nanjing, or Beijing (CN)

( * ) Notice: Subject to any disclaimer, the term of this patent is extended or adjusted under 35 U.S.C. 154(b) by 0 days.

(21) Appl. No.: 15/323,407

(22) PCT Filed: Jan. 15, 2015

(86) PCT No.: PCT/CN2015/070735
§ 371 (c)(1),
(2) Date: Dec. 31, 2016

(87) PCT Pub. No.: WO2015/169109
PCT Pub. Date: Nov. 12, 2015

(65) Prior Publication Data
US 2017/0249955 A1    Aug. 31, 2017

(30) Foreign Application Priority Data
May 6, 2014    (CN) .......................... 2014 1 0189040

(51) Int. Cl.
 G10K 11/178    (2006.01)
 G10L 21/0232   (2013.01)
 (Continued)

(52) U.S. Cl.
 CPC .......... G10L 21/0232 (2013.01); G06F 17/11 (2013.01); G06N 3/02 (2013.01);
 (Continued)

(58) Field of Classification Search
 CPC ......... G10K 2210/3028; G10K 11/178; G10K 2210/3049; G10K 2210/3055;
 (Continued)

(56) References Cited

U.S. PATENT DOCUMENTS 3,693,749 A    9/1972  Motsinger et al.
5,293,578 A *  3/1994  Nagami ............... H03G 9/025
                                                  381/71.14
(Continued)

FOREIGN PATENT DOCUMENTS

CN    102208263    10/2011
CN    103475336    12/2013
(Continued)

OTHER PUBLICATIONS

Solar Turbines. Noise prediction guidelines for industrial gas turbine. table 1 on p. 8.
Machines translation of CN103475336.

*Primary Examiner* — George C Monikang
(74) *Attorney, Agent, or Firm* — Treasure IP Group, LLC (57) ABSTRACT

The noise suppression method of individual active noise reduction system comprises the steps that: (1) initial noise
(Continued)

digital signals are received and converted to serve as input signals of a BP neural network; (2) the input signals are processed to generate secondary digital signals; (3) the secondary digital signals are output to a loudspeaker and secondary noise is generated; (4) remained noise digital signals obtained by overlapping the initial noise and the secondary noise are received; whether remained noise digital signals is continuously constant for the set times is judged; if yes, the secondary digital signals are kept outputting; (5) if not, BP neural network parameters are optimized and adjusted with the amplitude of the remained noise digital signals being minimum as the optimality principle; remained noise digital signals of previous step are served as new input signals and the step (2) is executed again.

5 Claims, 4 Drawing Sheets (51) Int. Cl.
  *G06N 3/02* (2006.01)
  *H01F 27/33* (2006.01)
  *G06F 17/11* (2006.01)
  *G06N 3/04* (2006.01)
  *G06N 3/08* (2006.01)
  *G06N 5/04* (2006.01)
  *H04R 3/00* (2006.01)
  *H04R 3/04* (2006.01)

(52) U.S. Cl.
  CPC ............... *G06N 3/04* (2013.01); *G06N 3/084* (2013.01); *G06N 5/04* (2013.01); *G10K 11/1785* (2018.01); *G10K 11/17881* (2018.01); *H01F 27/33* (2013.01); *H04R 3/005* (2013.01); *H04R 3/04* (2013.01); *G10K 2210/125* (2013.01); *G10K 2210/3026* (2013.01); *G10K 2210/3027* (2013.01); *G10K 2210/3038* (2013.01); *H04R 2410/05* (2013.01)

(58) Field of Classification Search
  CPC ..... G10K 2210/3056; G10K 2210/108; G10K 2210/3022; G10K 2210/3023; G10K 2210/3026; G10K 2210/3027; B64C 2220/00
  USPC ........................................ 381/71.8, 71.1–71.3
  See application file for complete search history.

(56) References Cited

U.S. PATENT DOCUMENTS

| 5,315,661 | A | * | 5/1994 | Gossman | ............. | G10K 11/178 |
| | | | | | | 381/71.1 |
| 5,381,485 | A | * | 1/1995 | Elliott | ................. | G10K 11/178 |
| | | | | | | 381/71.6 |
| 5,386,689 | A | * | 2/1995 | Bozich | ................ | G10K 11/178 |
| | | | | | | 381/71.11 |
| 2009/0097679 | A1 | * | 4/2009 | Maeda | .................... | H04S 3/008 |
| | | | | | | 381/302 |

FOREIGN PATENT DOCUMENTS

| CN | 103971988 | 8/2014 |
| DE | 102008061552 | 7/2010 |

* cited by examiner

TRANSFORMER NOISE SUPPRESSION METHOD

CROSS REFERENCE TO RELATED APPLICATION

This application is a National Phase application of, and claims priority to, PCT Application No. PCT/CN2015/070735, filed on Jan. 15, 2015 entitled "A TRANSFORMER NOISE SUPPRESSION METHOD," which claims priority to Chinese Application No. 201410189040.5, filed on May 6, 2014. Both the PCT Application and Chinese Application are incorporated herein by reference in their entireties.

TECHNICAL FIELD

The invention relates to a method for suppressing transformer noise, in particular to a transformer noise suppression method based on improved particle BP neural network, and belongs to the technical field of power supply.

TECHNIQUE BACKGROUND

Research shows that the substation noise is mainly the noise of large power transformer, and the power transformer noise comes from the transformer body and cooling system.

Transformer body noise mainly from the core vibration caused by the magnetostriction of silicon steel sheet and the electromagnetic force generated by the current flowing through the winding. The energy is mainly concentrated in the integer multiple frequency of fundamental frequency (100 Hz) below 500 Hz. It has the characteristics of strong penetrating ability, slow decay and so on. Transformer cooling system noise is mainly due to the fan and oil pump running vibration. The energy is mainly concentrated in the high frequency part above 500 HZ. This part of noise attenuation is fast. Transformer low frequency noise is the main cause of environmental pollution, control of this part of the noise is necessary.

Chinese patent CN102355233A uses fixed-frequency sine and cosine signals synthesized using direct digital synthesis as the reference signal which frequency value corresponds to the rated frequency of harmonic noise. CN102176668A directly digitally synthesizes a corresponding reference signal according to the fundamental frequency component of the picked-up primary noise. The above patents use digital direct synthesize reference signal, can only reduce the noise of some frequency components. Although the traditional F-XLMS filter algorithm can suppress all the frequency components of noise, but it cannot deal with time-varying, nonlinear noise. BP neural network has the ability of non-linear processing, self-adaptability and robustness. Therefore, scholars apply the BP neural network algorithm to the noise reduction field. Traditional BP neural network inherent convergence speed is slow and is easy to fall into the local minimum, so that the effect of noise control is not ideal. Therefore, we need to find a better filtering algorithm to achieve better noise reduction effect.

SUMMARY OF THE INVENTION

The object of the present invention is to disclose a transformer noise suppressing method which can effectively reduce noise.

In order to achieve the above object, the transformer noise suppression method of the present invention builds a system composed mainly of a controller including an intelligent chip and an initial noise measuring microphone, a residual noise measuring microphone, and a loudspeaker, the controller performs noise suppression in the following steps:

The first step is to receive an initial noise digital signal transmitted and converted by the initial noise measurement microphone in the vicinity of the noise source as an input signal of the BP (Back Propagation) neural network.

The second step is to process the input signal by BP neural network to generate a secondary digital signal whose phase is deviated from the input signal.

The third step is to convert the secondary digital signal into an analog signal, amplify and output the secondary signal to the loudspeaker to generate a secondary noise having an inhibitory effect on the initial noise.

The fourth step is to receive the initial noise picked up by the residual noise measurement microphone and the residual noise digital signal superimposed and converted by the secondary noise to determine whether the amplitude of the residual noise digital signal has been continuously set the number of times unchanged, if so, the secondary digital signal output is kept, otherwise proceed to the next step.

The fifth step is to minimize the residual noise digital signal amplitude as the principle of optimization to optimize and adjust the BP neural network parameters, the initial noise digital signal of the next time as the new BP neural network input signal, and then repeat the second step.

Compared with the current technology, the invention can effectively reduce the noise of the transformer and other noise sources in the substation by setting up a complete set of single channel transformer noise reduction system. The invention can rapidly suppress the noise in a certain range of the noise source such as the transformer by means of BP neural network and solve the problems of high cost, poor effect and poor portability of the traditional noise reduction method.

SPECIFIC EMBODIMENTS

The technical solution of the present invention will be described in further detail with reference to the accompanying drawings.

Figure 1:
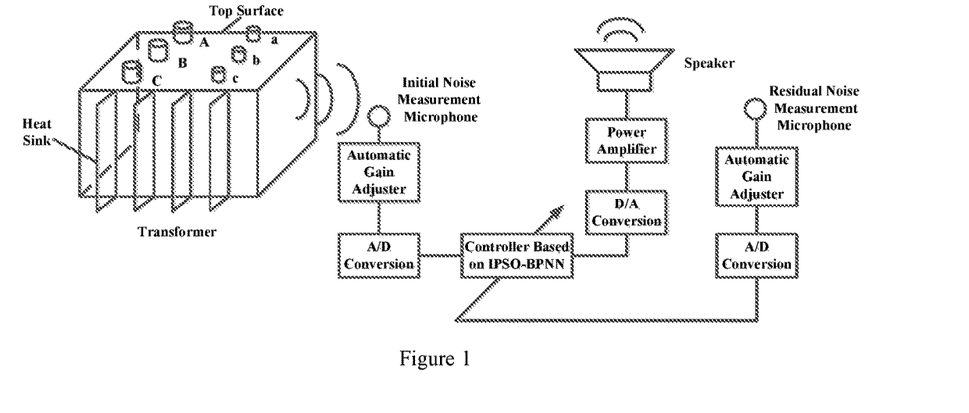
FIG. 1 is schematic structural view of an embodiment of the present invention.

The present embodiment is a transformer noise suppression method based on an improved particle BP neural network. It will not only effectively suppress noise, but also further to overcome the drawback that BP neural network convergence rate is slow and easy to fall into the local minimum. As shown in FIG. 1, main components of the system include: the controller which contains TMS320VC5509DSP smart chip, 2 PCM6110 microphones as initial noise measuring microphone and residual noise measuring microphone respectively, Swans S6.5 low frequency speaker. The initial noise measurement microphone and the residual noise measurement microphone are connected with the corresponding input port of DSP chip via the automatic gain adjustment module of the sound processing chip and A/D converter module. The output port of the DSP chip is connected with the speaker via the D/A conversion module of the sound processing chip and the power amplifier. TLV320AIC23 audio chip is a sound processing chip, which contains the automatic gain module, A/D converter module and D/A converter module.

Specific to a transformer site, the signal acquisition frequency is set to 5000 Hz. The BP neural network structure is set as a 2-10-1 filtering algorithm, the excitation functions of the hidden layer and the output layer are Sigmoid function and Purelin function. The size of the particle group is 30, the maximum genetic algebra is 10. According to the way particle coding, the dimension of the particle is 78. And, $c_1=c_2=1.3$, $w_0=0.9$, $p_{mmax}=0.1$, $p_{mmin}=0.05$. The distance between initial noise measuring microphone and transformer is 10 cm. The distance between speaker and transformer is 30 cm. The distance between residual noise measuring microphone and transformer is 20 cm.

Figure 2:
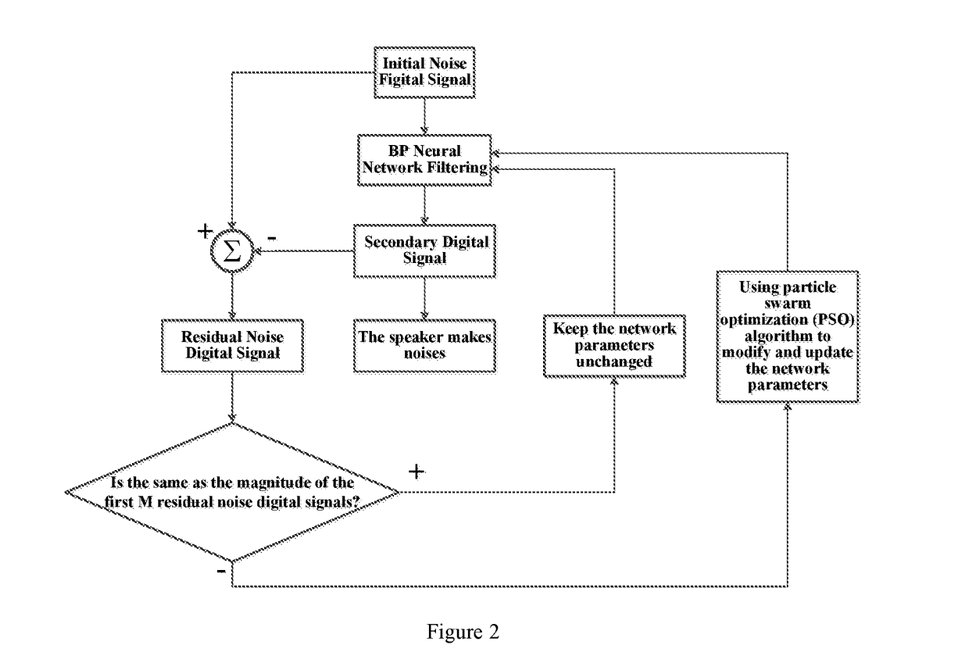
FIG. 2 is a flowchart of a digital signal basic processing procedure of the embodiment in FIG. 1.
Figure 3:
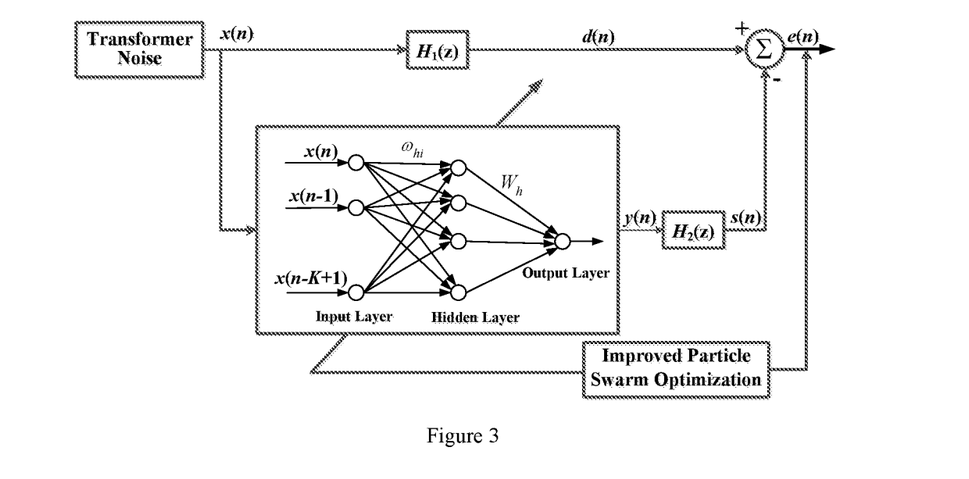
FIG. 3 is a system block diagram of an improved particle BP neural network of the embodiment in FIG. 1.

The controller follows the steps below to achieve noise suppression in operation (see FIG. 2):

The first step is to receive the initial noise digital signal transmitted and converted by the initial noise measurement microphone in the vicinity of the noise source as the input signal of the BP (Back Propagation) neural network.

The second step is to process the input signal by BP neural network to generate the secondary digital signal whose phase is deviated from the input signal.

The third step is to convert the secondary digital signal into an analog signal, amplify and output the secondary signal to the loudspeaker to generate a secondary noise having an inhibitory effect on the initial noise.

The fourth step is to receive the initial noise picked up by the residual noise measurement microphone and the residual noise digital signal superimposed and converted by the secondary noise to determine whether the amplitude of the residual noise digital signal has been continuously set the number of times unchanged, if so, the secondary digital signal output is kept, otherwise proceed to the next step.

The fifth step is to minimize the residual noise digital signal amplitude as the principle of optimization to optimize and adjust the BP neural network parameters, the initial noise digital signal of the next time as the new BP neural network input signal, and then repeat the second step.

In order to overcome the drawback that the current technology is slow to converge and easily fall into local minima, optimizing and adjusting the parameters of BP neural network in the fifth step of transformer noise suppression method in the embodiment is carried out by the improved particle swarm optimization algorithm which follow the procedures below:

Step 1: According to the structure of BP neural network, we can determine the dimension of particles and generate N initial particles randomly.

Step 2: The weight coefficient $\omega_{hi}(n)$ between the input layer neuron i and the hidden layer neuron h in the neural network, the weight coefficient $W_h(n)$ between the hidden layer neuron h and the output layer, the threshold value $GE_h(n)$ of hidden layer neuron h and the threshold value ge(n) of output layer neuron at the nth time are real-number encoded according to the predetermined order, and the corresponding real number particles are formed. Each particle corresponds to a group of network parameters. The encoding format is:

| $\omega_{11}$ | $\omega_{12}$ | ... | $\omega_K$ | $W_1$ | $GE_1$ | ... | $\omega_{J1}$ | $\omega_{J2}$ | ... | $\omega_{JK}$ | $W_J$ | $GE_J$ | ge |

Step 3: Select the residual noise signal e(n) of the system as the judgment criterion of network parameters, and use the following fitness function F(n) as the particle position coding and formula:

$$F(n) = \sqrt{\frac{(x(n) * h_1(n) - y(n) * h_2(n))^2}{2}} \quad [1]$$

In the above formula, x(n) is the initial noise digital signal input at the nth time; $H_1(z)$ and $H_2(z)$ are the transfer functions of the primary channel and the secondary channel respectively; y(n) is the digital signal of the network output at the n-th time, and the formula is:

$$y(n) = \sum_{h=1}^{J} W_h(n) f\left(\sum_{i=1}^{K} \omega_{hi}(n) x_i(n) - GE_h(n)\right) - ge(n) \quad [2]$$

In the above formula, $x_i(n)=x(n-i+1)$ represents the input of neuron i in the input layer; $f(x)=2/(1+\exp(-2x))-1$ denotes the activation function of the hidden layer of the network; K denotes the total number of neurons in the input layer; J denotes the total number of neurons in the hidden layer.

Step 4: According to the particle location code and formula [1], the fitness value of each particle is calculated; comparing the particle's current position fitness value with the position fitness value of the particle before the iteration, if the former is smaller than the latter, then updates the particle's optimal position $P_i=[p_{i1}, p_{i2}, \ldots, p_{i(J(K+2)+1)}]$. Otherwise, it remains unchanged. At the same time, comparing the particle's fitness value with the fitness value of the particle before the iteration, if the former is smaller than the latter, then updates the optimal position of entire particle group $P_g=[p_{g1}, p_{g2}, \ldots, p_{g(J(K+2)+1)}]$. Otherwise, it remains unchanged.

Step 5: If the iteration times has reached the maximum iteration number, stop the iteration and decode the optimal position of the particle swarm to get the corresponding BP neural network parameters. Otherwise, proceed to the next step.

Step 6: Define the evolution degree of particle swarm:

$$\sigma(k) = \text{abs}\left(\frac{f_{gbest}(k) - f_{avg}(k)}{f_{gbest}(1) - f_{avg}(1)}\right) \quad [3]$$

In the above formula, $f_{gbest}(k)$ and $f_{avg}(k)$ are respectively the global optimal fitness value and average fitness value of the particle group at the kth iteration.

The inertia factor of the dynamic change is defined as:

$$w(k) = \left(1 - \frac{1}{1 + \exp(\sigma(k))}\right) w_0 \quad [4]$$

In the above formula, $w_0$ is the initial value.

The definition of adaptive mutation probability calculation formula is:

$$p_m(k) = \begin{cases} \left(p_{mmin} + \frac{(p_{mmax} - p_{mmin})|f_{gbest}(k) - f_{avg}(k)|}{|f_{gbest}(k) - f_i(k)|}\right)\xi(k), & f_i(k) < f_{avg}(k) \\ p_{mmax}\xi(k), & f_i(k) \geq f_{avg}(k) \end{cases} \quad [5]$$

$$\xi(k) = \frac{1}{\varepsilon + \sigma(k)} \in [0, 1] \quad [6]$$

where $p_m(k)$ is the mutation probability of the kth iteration of the particle swarm; $p_{mmax}$ and $p_{mmin}$ are the maximum and minimum values of the mutation rate respectively; $f_i(k)$ is the fitness value of the kth iteration of the particle I; $\varepsilon$ is the constant.

The new velocity and position after the particle mutation is defined as:

$$v_{id}(k+1) = w(k)v_{id}(k) + c_1 r_1(p_{id}(k) - x_{id}(k)) + c_2 r_2(p_{gd}(k) - x_{id}(k)) \quad [7]$$

$$X_i(k+1) = X_i(k) + p_m(k)(X_{R_1}(k) - X_{R_2}(k)) + V_i(k) \quad [8]$$

where $v_{id}(k)$ is the velocity of the dth dimension of the particle i in the kth iteration; $V_i(k)$ is the velocity vector of the particle i in the kth iteration; $p_{id}(k)$ is the best position of the dth dimension of the kth iteration of the particle i; $p_{gd}(k)$ is the best position of the dth dimension of the kth iteration of the whole population; $x_{id}(k)$ is the position of the dth dimension of the particle i in the kth iteration; $X_i(k)$ is the position vector of the kth iteration of particle i; $c_1$ and $c_2$ are nonnegative acceleration constants; $r_1$ and $r_2$ are random numbers transformed in the range [0,1]; $R_1$ and $R_2$ are unequal positive integers, in the range [1, N].

Step 7: Firstly, calculate the inertia factor and particle mutation rate of this iteration by the above formulas [4] and [5], and then update the velocity and position of all the particles by using formulas [7] and [8] to generate new generation particles group and return to step four.

This can be achieved: when the digital signal x(n) at the nth time is input to the controller, it is filtered through a BP neural network with random parameters to get an output value y(n). After the secondary acoustic channel transfer function, the output value becomes S(n). That is, the secondary digital signal at the nth time generates the error digital signal e(n) after superposition. When the error digital signal e(n) at the nth time is fed back into the controller, combining with the reference digital signal x(n) at the nth time, the relevant parameters in the BP neural network are modified by using the improved particle swarm optimization algorithm. After the above processing, we can get the new weight coefficient and threshold coefficient corresponding to the BP neural network at the nth time, and then replace these original parameters with the new parameters. When the initial noise digital signal x(n+1) at the (n+1)-th time is input to the controller, it is filtered through an updated BP neural network to obtain a new output value. After the secondary acoustic channel transfer function, the output value becomes s(n+1). That is, the secondary digital signal at the (n+1) th time.

Figure 4:
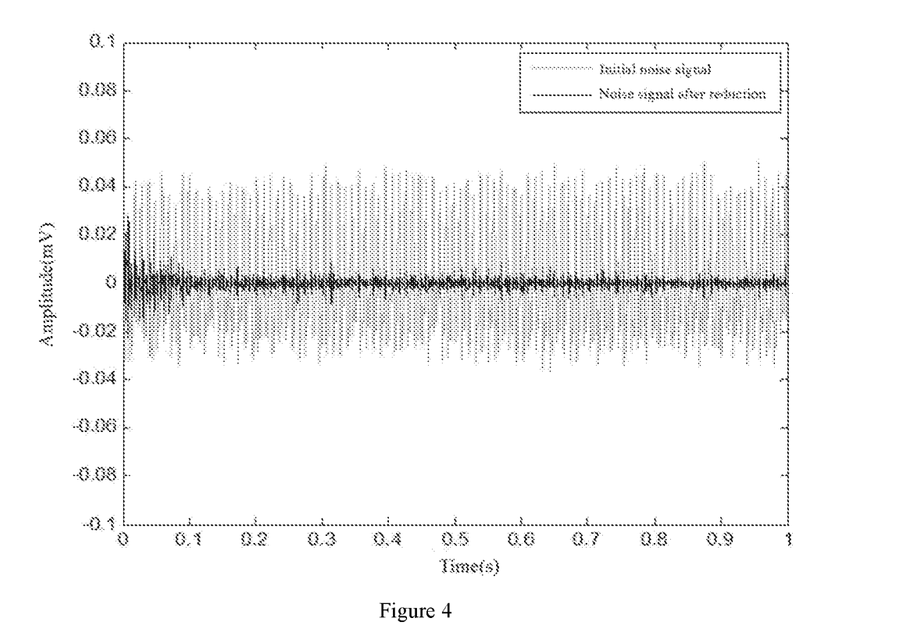
FIG. 4 is a time-domain comparison of the residual noise measurement microphone pick-up signals before and after noise reduction of the embodiment in FIG. 1.
Figure 5:
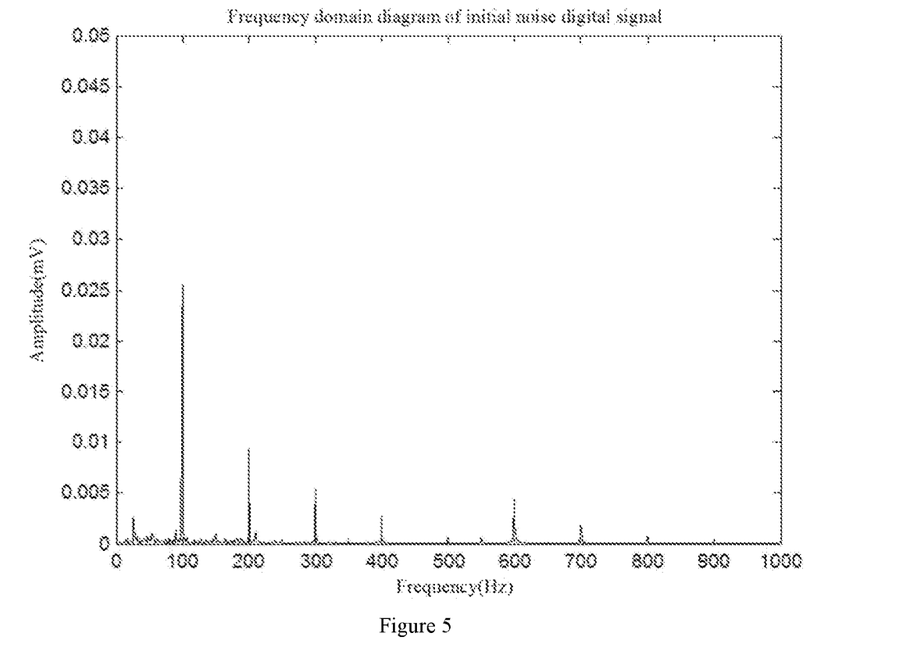
FIG. 5 is a frequency domain diagram of the residual noise measurement microphone pickup signal before the noise reduction of the embodiment of FIG. 1.
Figure 6:
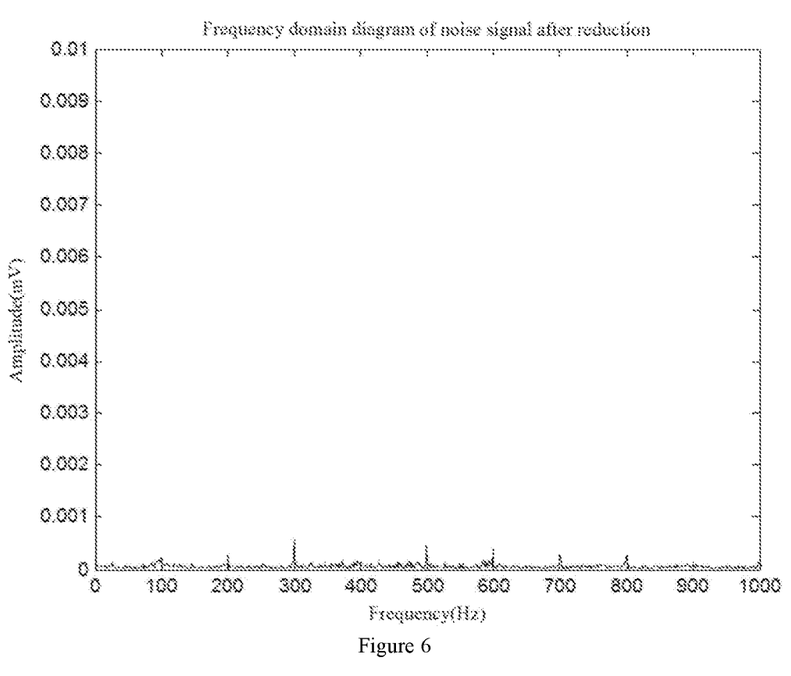
FIG. 6 is a frequency domain diagram of a residual noise measurement microphone pickup signal after noise reduction in the embodiment of FIG. 1.

FIG. 4, FIG. 5 and FIG. 6 show the comparison of the signal picked up by the residual noise measurement microphone before and after noise reduction. It can be seen that, the effect is very significant. The present embodiment not only constructs a reasonable transformer noise suppression system, but also integrates the particle swarm optimization algorithm on the basis of BP neural network filtering to improve the correction ways of weights and thresholds in BP neural network by using improved particle swarm optimization algorithm. It overcomes the inherent defects of the algorithms such as gradient descent optimization, and can effectively suppress the noise of all frequency components of the transformer.

The above description is merely a specific embodiment of the present invention, but the scope of the present invention is not limited thereto. Any conceivable transformations or substitutions within the technical scope disclosed by the present inventors are within the scope of the present invention.

The invention claimed is:

1. A method of suppressing noise of a transformer, characterized by the following steps:
    using a system is consisting essentially of a controller including
    an intelligent chip, an initial noise measuring microphone, a residual noise measuring microphone, and a loudspeaker, wherein the controller is configured to suppress noise suppression concentrated in integer multiple frequency of fundamental frequency (100 Hz), in the following steps:
    receiving, in a first step, an initial noise digital signal transmitted and converted by the initial noise measuring microphone in the vicinity of a noise source as an input signal of a BP (Back Propagation) neural network;
    processing, in a second step, the input signal by BP neural network to generate a secondary digital signal whose phase is deviated from the input signal;
    converting, in a third step, the secondary digital signal into an analog signal, amplifying and outputting the secondary signal to the loudspeaker to generate a secondary noise having an inhibitory effect on the initial noise;
    receiving, in a fourth step, the initial noise picked up by the residual noise measurement microphone and the residual noise digital signal superimposed and converted by the secondary noise to determine whether the amplitude of the residual noise digital signal has been continuously set the number of times unchanged, if so, the secondary digital signal output is kept, otherwise proceed to the next step; and
    minimizing, in a fifth step, the residual noise digital signal amplitude as the principle of optimization to optimize and adjust the BP neural network parameters, the initial noise digital signal of the next time as the new BP neural network input signal, and then repeat the second step,
    wherein the first-fifth steps are performed sequentially in that order;
    performing the fifth step of optimizing and adjusting the parameters of the BP neural network by an improved particle swarm optimization algorithm, comprising a step of:
    Step 2: forming weight coefficient $\omega_{hi}(n)$ between the input layer neuron i and the hidden layer neuron h in the neural network, the weight coefficient $W_h(n)$ between the hidden layer neuron h and the output layer, the threshold value $GE_h(n)$ of hidden layer neuron h and the threshold value ge (n) of output layer neuron at the nth time are real-number encoded according to the predetermined order, and the corresponding real number particles wherein each particle corresponds to a group of network parameters and an encoding format is:

| $\omega_{11}$ | $\omega_{12}$ | ... | $\omega_K$ | $W_1$ | $GE_1$ | ... | $\omega_{J1}$ | $\omega_{J2}$ | ... | $\omega_{JK}$ | $W_J$ | $GE_J$ | ge |
|---|---|---|---|---|---|---|---|---|---|---|---|---|---|

2. The transformer noise suppression method according to claim 1 is characterized by the following steps:

The step of optimizing and adjusting the parameters of the BP neural network in the fifth step is carried out by the improved particle swarm optimization algorithm which further comprising:

Step 1: determining, dimension of particles, according to the structure of the BP neural network and generating N initial particles randomly;

Step 3: Selecting the residual noise signal e(n) of the system as a judgment criterion of network parameters, and using the following fitness function F(n) as the particle position coding and formula:

$$F(n) = \sqrt{\frac{(x(n)*h_1(n) - y(n)*h_2(n))^2}{2}} \quad [1]$$

in formula [1] x(n) is the initial noise digital signal input at the nth time; $H_1(z)$ and $H_2(z)$ are the transfer functions of the primary channel and the secondary channel respectively; y(n) is the digital signal of the network output at the n-th time, and the formula is:

$$y(n) = \sum_{h=1}^{J} W_h(n) f\left(\sum_{i=1}^{K} \omega_{hi}(n) x_i(n) - GE_h(n)\right) - ge(n) \quad [2]$$

in formula [2], $x_i(n)=x(n-i+1)$ represents the input of neuron i in the input layer; $f(x)=2/(1+\exp(-2x))-1$ denotes the activation function of the hidden layer of the network; K denotes the total number of neurons in the input layer; J denotes the total number of neurons in the hidden layer;

Step 4: According to particle location code and formula [1], calculating a fitness value of each particle; comparing a particle's current position fitness value with the position fitness value of the particle before the iteration, if the former is smaller than the latter, then updating the particle's optimal position $P_i=[p_{i1}, p_{i2}, \ldots, p_{i(J(K+2)+1)}]$; otherwise, the particle's optimal position remains unchanged; at the same time, comparing the particle's fitness value with the fitness value of the particle before the iteration, if the former is smaller than the latter, then updating the optimal position of entire particle group $P_g=[p_{g1}, p_{g2}, \ldots, p_{g(J(K+2)+1)}]$, otherwise the optimal position of entire particle group remains unchanged;

Step 5: stopping the iteration if the iteration times has reached the maximum iteration number, decoding the optimal position of the particle swarm to get the corresponding BP neural network parameters; otherwise proceeding to step 6;

Step 6: defining an evolution degree of particle swarm:

$$\sigma(k) = \text{abs}\left(\frac{f_{gbest}(k) - f_{avg}(k)}{f_{gbest}(1) - f_{avg}(1)}\right) \quad [3]$$

in formula [3], $f_{gbest}(k)$ and $f_{avg}(k)$ are respectively the global optimal fitness value and average fitness value of the particle group at the kth iteration;

an inertia factor of the dynamic change is defined as:

$$w(k) = \left(1 - \frac{1}{1+\exp(\sigma(k))}\right) w_0 \quad [4]$$

in formula [4], $w_0$ is an initial value,
a definition of adaptive mutation probability calculation formula is:

$$p_m(k) = \quad [5]$$
$$\begin{cases} \left(p_{m\min} + \frac{(p_{m\max} - p_{m\min})|f_{gbest}(k) - f_{avg}(k)|}{|f_{gbest}(k) - f_i(k)|}\right)\xi(k), f_i(k) < f_{avg}(k) \\ p_{m\max}\xi(k), f_i(k) >= f_{avg}(k) \end{cases}$$

$$\xi(k) = \frac{1}{\varepsilon + \sigma(k)} \in [0, 1] \quad [6]$$

wherein $p_m(k)$ is the mutation probability of the kth iteration of the particle swarm; $p_{mmax}$ and $p_{mmin}$ are the maximum and minimum values of the mutation rate respectively; $f_i(k)$ is the fitness value of the kth iteration of the particle I; $\varepsilon$ is the constant;

a new velocity and position after the particle mutation is defined as:

$$v_{id}(k+1) = w(k)v_{id}(k) + c_1 r_1 (p_{id}(k) - x_{id}(k)) + c_2 r_2 (p_{gd}(k) - x_{id}(k)) \quad [7]$$

$$X_i(k+1) = X_i(k) + p_m(k)(X_{R_1}(k) - X_{R_2}(k)) + V_i(k) \quad [8]$$

wherein $v_{id}(k)$ is the velocity of the dth dimension of the particle i in the kth iteration;
$V_i(k)$ is the velocity vector of the particle i in the kth iteration;
$p_{id}(k)$ is the best position of the dth dimension of the kth iteration of the particle i;
$p_{gd}(k)$ is the best position of the dth dimension of the kth iteration of the whole population;
$x_{id}(k)$ is the position of the dth dimension of the particle i in the kth iteration;
$X_i(k)$ is the position vector of the kth iteration of particle i;
$c_1$ and $c_2$ are nonnegative acceleration constants;
$r_1$ and $r_2$ are random numbers transformed in the range [0,1];
$R_1$ and $R_2$ are unequal positive integers, in the range [1, N];

Step 7: calculating the inertia factor and particle mutation rate of this iteration by the formulas [4] and [5], and then updating the velocity and position of all the particles by using formulas [7] and [8] to generate new generation particles group and return to step 4.

3. The transformer noise suppression method according to claim 2:
wherein the smart chip is a DSP chip, and the initial noise measurement microphone and the residual noise measurement microphone are connected with a corresponding input port of DSP chip via the automatic gain adjustment module of the sound processing chip and A/D converter module the output port of the DSP chip is connected with the speaker via the D/A conversion module of the sound processing chip and the power amplifier.

4. The transformer noise suppressing method according to claim 3, wherein
the BP neural network structure is set as a 2-10-1 filtering algorithm,
the excitation functions of the hidden layer and the output layer are Sigmoid function and Purelin function.

5. The transformer noise suppressing method according to claim 4 wherein size of the particle group is 30, the maximum genetic algebra is 10, and the dimension of the particle is 78.

\* \* \* \* \*